July 19, 1966  J. H. BERTIN  3,261,418
AIR CUSHION TRACK ARRANGEMENT FOR VEHICLE
Filed March 10, 1964
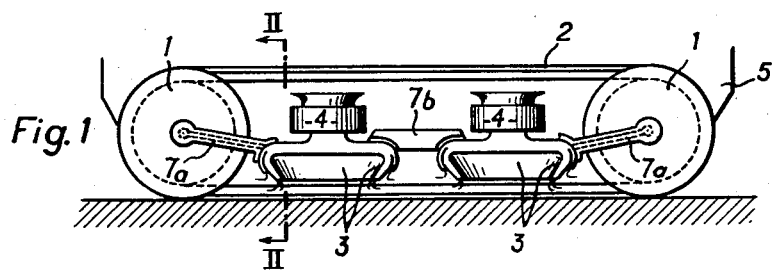
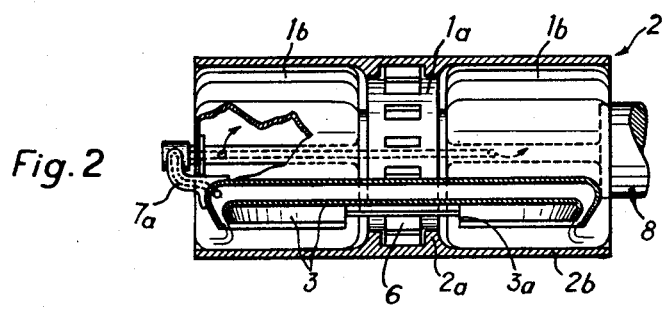
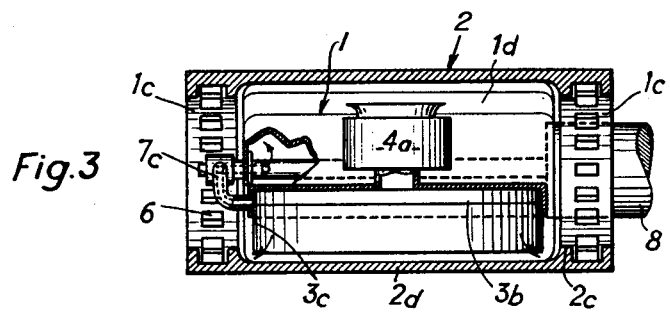
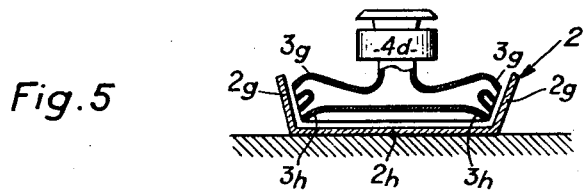
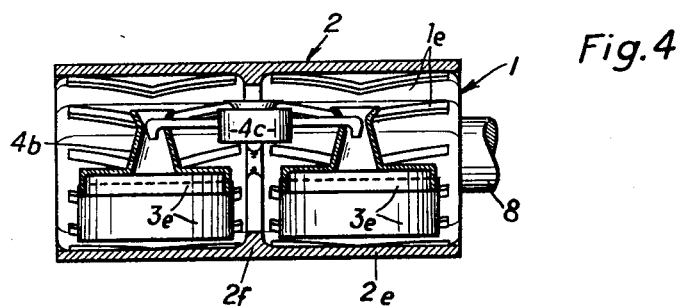

United States Patent Office 3,261,418
Patented July 19, 1966

3,261,418
AIR CUSHION TRACK ARRANGEMENT
FOR VEHICLE
Jean Henri Bertin, Neuilly-sur-Seine, France, assignor to Societe Bertin & Cie, Paris, France, a company of France
Filed Mar. 10, 1964, Ser. No. 350,900
Claims priority, application France, Apr. 14, 1960, 824,368; June 6, 1963, 937,275
10 Claims. (Cl. 180—7)

This is a continuation-in-part of my application Serial No. 102,315, filed April 11, 1961, now issued as Patent No. 3,130,804.

This invention relates to vehicles designed to travel over soft ground and which are consequently characterized by their low bearing pressure on the ground, or—what amounts to the same thing—by their large bearing surface for a given overall weight.

Tracked vehicles, which come under this definition, are well known per se, as are also their drawbacks. The most important of these is the need to provide a large number of intermediate roller sleeves for distributing the weight of the vehicle over its tracks, in order that the latter may not be called upon to withstand concentrated longitudinal loads, which in turn would entail a very sturdy type of construction and large frictional losses. In addition, such vehicles are costly to build and maintain.

The ground-effect or air-cushion types of vehicles developed latterly are likewise characterized by a low bearing pressure on the ground but the supporting gas which ensures uniform distribution of the weight of the vehicle escapes from the periphery thereof with a force and in directions such that it is difficult to prevent dust or spray from being thrown up. Moreover, their steering is relatively lacking in precision with respect to the steering of usual vehicles in effective contact with the ground.

It is one object of the present invention to provide a vehicle whose bearing pressure on the ground is small and uniformly distributed, by use of very simple means requiring little maintenance.

It is another object of the invention to provide a tracked vehicle whose weight is very uniformly distributed over the surface of the lower track portion in contact with the ground, thereby enabling the tracks to be made of a very flexible and possibly elastic material susceptible of undergoing local deformation following contact with an obstacle.

It is a further object of the invention to provide a vehicle which bears upon the ground through the medium of air cushions, but wherein a very flexible track is positioned between the air cushions and the ground whereby to reduce projections of matter into the air.

It is still another object of the invention to provide a tracked vehicle whose tracks are both loaded and guided laterally by means of air cushions.

It is yet another object of the invention to provide a vehicle having endless tracks each of which is loaded by an air cushion, wherein said tracks run over terminal rollers having a deformation capability substantially equal to that of the lower loaded portion of the track, which rollers may accordingly be hollow, for instance, and inflated with compressed gas. Said rollers may additionally be provided on their outer peripheries with protrusions for driving said tracks. As an alternative embodiment, they may be associated to at least one sprocket wheel which may itself be deformable.

Other features of the present invention will be apparent from the following detailed description of some specific embodiments thereof, given by way of example with reference to the accompanying drawings, in which:

FIGURE 1 is a schematic side elevation view of an overall arangement according to the invention;

FIGURE 2 is a corresponding cross-sectional view on an enlarged scale, showing the general arrangement of a track and its associated driving and bearing members;

FIGURES 3 and 4 are similar cross-sectional views of alternative forms of embodiment; and FIGURE 5 is a cross-sectional view of a trough-shaped track which is guided laterally by auxiliary air cushions.

Reference will now be had to the drawings for a detailed description of various embodiments of a track arrangement for enabling a vehicle 5 to bear with a light and uniformly distributed pressure on the ground, details of the structural design of said vehicle being omitted since the invention is limited to the bearing and, subsidiarily, to the guidance and propulsion means of the vehicle.

The arrangement contemplated for fulfilling these functions is characterized by the interposition of a flexible track between the ground and an air cushion supporting the vehicle, whereby the fluid issuing from the discharge nozzle is projected against the track instead of directly against the ground. This arrangement offers several advantages which include the prevention of projections of dust or water lying on the ground, the elimination of the suspension roller sleeves customarily used to distribute the weight of a tracked vehicle over its tracks, the reduction of friction and maintenance.

It is to be clearly understood that the term "air cushion" extends also to cases wherein the fluid issuing from the discharge nozzle is a compressible fluid other than air, or possibly even an incompressible fluid.

Referring to FIGURES 1 and 2 for a first form of embodiment to the invention, there is shown thereon an endless track 2 passing around terminal rollers 1. Between the upper and lower portions of said track is disposed at least one air cushion platform provided with a peripheral nozzle 3 supplied by a compressed gas generator 4. The peripheral nozzle 3 is directed inwardly of the cushion and faces the lower ground-engaging portion of track 2, which portion is thus interposed between the air cushion and the ground.

Such an air cushion may be substituted with advantage for the multiple pressure rollers customarily used as intermediate support means on conventional tracks. Experiments have shown that there is a great difference in load distribution of the track over the ground in the case of an air cushion as opposed to usual intermediate rollers. The pressure exerted by a track according to this invention is both small and uniform, in consequence whereof such a track may be made very light in weight since the distorting forces applied thereto are markedly reduced.

The vehicle 5 may be propelled economically and with advantage by positively driving such tracks through the agency of at least one driving roller having suitable upstanding protrusions thereon.

An endless track 2 according to the invention generally has a very considerable width with respect to its thickness. By way of example, it may be made of rubber suitably reinforced with fabric layers, and comprise at least one tread band 2b and at least one thicker band 2a having recesses therein for drivingly engaging said track.

The air cushion platform means 3, 4 positioned above the lower ground-engaging portion of the track preferably comprises a plurality of air cushions and possibly also various means well known per se for bounding an individual air cushion and enabling the clearance between said air cushion means and the lower track portion to be varied. The peripheral blowing nozzle shown by way of example on FIGURES 1 and 2 comprises indents 3a in its front and rear portions in order to provide adequate clearance for the thicker band portion 2a.

The terminal rollers 1 are rendered integral with the air cushion platforms 3, 4 and the structure of vehicle 5 by means of tie members 7a, 7b, and consist of a plurality of side-by-side coaxial portions rigid with a common shaft 8. The general outer shape of these portions, which are tangential to the ground due to the fact that the lower track portion is straight, is preferably cylindrical.

Bearing portions 1b cooperate with tread bands 2b of the track and preferably possess a radial elasticity substantially equal to the vertical elasticity of the air cushion formed between the annular nozzle 3 and the track 2, and their diameter and radial thickness are such as to enable them to absorb even the largest of obstacles capable of being crossed by the track/air cushion system. Said bearing portions may be made of an elastic material such as rubber, but are preferably devised in the form of pneumatic tires, using a deformable envelope containing a compressible fluid under pressure. This fluid may be set under pressure at spaced time intervals, or may be continuously supplied by the generator 4 through a pipe 7a connected to a nozzle producing a fluid curtain around the periphery of a cushion. Said pipe 7a may incorporate a pressure reducing valve, whereby a given pressure ratio may be maintained between a bearing portion and an associated cushion. This ensures uniform elasticity of the vehicle suspension members such as the permanent inflation pressure of the portions 1b which keep inflated and can function even if not perfectly gas-tight.

Drive portions or sprockets 1a likewise forming part of the terminal rollers 1 provide driving engagement between the track 2 and each terminal roller. These sprockets, which are provided with protrusions 6 for cooperating with the recesses in the bands 2a associated to the track, may also be inflatable.

It goes without saying that numerous alternative embodiments may be devised in conformity with the foregoing. By way of example, various functions of the rollers 1, to wit, tensioning the track, driving and transversely guiding the same, lastly supporting part of the weight of the vehicle by bearing on possible local terrain irregularities, may be divided in various ways between the component parts of said rollers, while the number of individual such component parts may vary.

Reference to FIGURE 3 shows that the endless track comprises a wide central tread band 2d above which are respectively located a gas cushion platform 3b and the cylindrical bearing portions 1d of the terminal rollers 1. Each terminal roller comprises two sprockets 1c which engage respectively with two drive bands 2c flanking the tread band 2d and having a greater thickness than said tread band. It will be noted that the cushion 3b comprises a flexible skirt 3c and forms a plenum chamber which is associated to an individual generator 4a and caused to communicate with a bearing portion 1d through a pipe 7c. The greater thickness of the drive bands 2c reduces fluid-losses out of the cushion 3b and facilitates transverse guidance of the track 2.

FIGURE 4, which illustrates an alternative embodiment of FIGURE 2, shows two gas cushion platform means 3e which are supplied, for all practical purposes independently, by means of ejectors 4b connected to a common inducer gas generator 4c. The elastic bearing portions 1e are provided on their peripheries with protrusions which assist in driving the track at 2e, while the sides of said portions assist in guiding said track by cooperating with a central thickened portion 2f of said track.

Reference is lastly had to FIGURE 5 for a clear understanding of how a trough-shaped track with raised sides 2g may be used in conjunction with means 4d, 3g, 3h for generating lateral air cushions as well as a lower platform or supporting cushion, whereby to provide an arrangement capable of developing not only vertical supporting forces but also lateral guiding forces, as a conventional track or wheel. In this specific example, the peripheral nozzle 3 has a common plane of symmetry with the track 2. On either side of this plane of symmetry, said nozzle divides into two substantially straight nozzles 3g, 3h which are directed at the corresponding raised side 2g of the trough-like track and form therebetween a cavity within which is generated a lateral air cushion capable of developing a horizontally acting force.

It would alternatively be possible, without in any way departing from the scope of the invention, to drive a track by mere friction against cylindrical bearing portions forming part of the terminal rollers, rather than through driving engagement of protrusions on said portions and of corresponding recesses in the tracks. Recourse could also be had to plenum chamber type air cushions for transverse guidance of each track, in conjunction with the possible use of peripheral seals made of deformable material.

What is claimed is:

1. In a combined air-cushion and endless track vehicle, a fluid-cushion borne body, radially deformable terminal rollers of elastic material carried by said body and having a selected deformation capacity, at least one endless, flexible, ground-engaging track having an inner side engaged by and passing over said terminal rollers and an outer side for bearing against the ground along a lower run of said track, a source of pressure fluid on said body, means fed with pressure fluid from said source for forming a vertically deformable fluid cushion sustaining said body and active on the inner side of said lower run of the endless track and means providing a continuous fluid connection between said cushion forming means and said terminal rollers, so that the deformation capacity of said fluid cushion is substantially equal to the selected deformation capacity of said terminal rollers.

2. A vehicle as claimed in claim 1, wherein said terminal rollers each comprise an inflatable envelope filled with pressure fluid.

3. A vehicle as claimed in claim 2, comprising pressure-reducing means in said fluid connection for selecting a supply pressure to said fluid-cushion forming means different from the supply pressure to said inflatable terminal rollers.

4. A vehicle as claimed in claim 1, wherein said fluid-cushion forming means comprise means for forming two separate and distinct fluid cushions active on said inner side of the lower run of said enless track and transversely of said endless track.

5. A vehicle as claimed in claim 4, wherein said fluid cushions comprise plenum chamber cushions and said fluid-cushion forming means each comprise a skirt projecting toward said lower run and adapted to bound laterally a respective fluid cushion.

6. A vehicle as claimed in claim 5, wherein said source of pressure fluid comprises a separate ejector effective to induce ambient air associated with each plenum chamber, and a common pressure gas supply means for energizing said ejectors.

7. A vehicle as claimed in claim 1, wherein said endless track has a trough-shaped cross-section with a substantially horizontal central strip and two raised lateral parts projecting from said central strip, and wherein said fluid-cushion forming means comprise means for forming distinct cushions on the inner sides of said central strip and both said lateral parts respectively.

8. A vehicle as claimed in claim 7, wherein said fluid-cushion forming means comprise means defining two pairs of substantially parallel slot-like nozzles extending lengthwise of the lower run of said endless track, each pair of nozzles facing one of said raised lateral parts, the nozzles being disposed in superposed relationship.

9. In a tracked vehicle having a body, at least one endless track for engaging the ground, means forming at least one vertically deformable fluid cushion coperative with said track sustaining said body, radially deformable, inflatable rollers carried by said body disposed spaced from each other, said endless track being disposed for passing over said rollers, a source of gaseous fluid on said vehicle, means providing a continuous fluid connection between said cushion forming means and said rollers, and means connecting said source of gaseous fluid to supply fluid to said means forming said fluid cushions.

10. In a tracked vehicle according to claim 9, including means on said inflatable rollers for driving said track.

References Cited by the Examiner

UNITED STATES PATENTS

| | | | |
|---|---|---|---|
| 2,698,667 | 1/1955 | Kropp | 180—9.2 |
| 3,095,938 | 7/1963 | Bertelsen | 180—7 |
| 3,117,643 | 1/1964 | Cockerell | 180—7 |

BENJAMIN HERSH, *Primary Examiner.*

A. HARRY LEVY, *Examiner.*

M. S. SALES, *Assistant Examiner.*